United States Patent
Zhou et al.

(10) Patent No.: US 9,892,124 B2
(45) Date of Patent: Feb. 13, 2018

(54) METHOD AND DEVICE FOR TRANSFERRING FILE

(71) Applicant: TENCENT TECHNOLOGY (SHENZHEN) COMPANY LIMITED, Shenzhen, Guangdong Province (CN)

(72) Inventors: Hong-Chang Zhou, Shenzhen (CN); Jie Chen, Shenzhen (CN); Pu Cai, Shenzhen (CN); Xiao-Jie Dong, Shenzhen (CN); Sheng-Yu Yin, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 326 days.

(21) Appl. No.: 14/318,545

(22) Filed: Jun. 27, 2014

(65) Prior Publication Data

US 2014/0317071 A1 Oct. 23, 2014

Related U.S. Application Data

(63) Continuation of application No. PCT/CN2013/088322, filed on Dec. 2, 2013.

(30) Foreign Application Priority Data

Feb. 6, 2013 (CN) .......................... 2013 1 0047083

(51) Int. Cl.
G06F 17/30 (2006.01)
G06F 7/00 (2006.01)
H04L 1/16 (2006.01)

(52) U.S. Cl.
CPC ...... *G06F 17/30091* (2013.01); *H04L 1/1635* (2013.01)

(58) Field of Classification Search
USPC ........................................................ 707/705
See application file for complete search history.

(56) References Cited

U.S. PATENT DOCUMENTS 7,623,546 B1 * 11/2009 Bashyam ................ H04L 47/10
370/465
9,043,486 B2 * 5/2015 Bailey ................... H04L 69/326
709/231

(Continued)

FOREIGN PATENT DOCUMENTS

CN 101217412 A 7/2008
CN 101656756 A 2/2010

(Continued)

*Primary Examiner* — Kuen Lu
(74) *Attorney, Agent, or Firm* — Morgan, Lewis & Bockius LLP

(57) ABSTRACT

The disclosed invention relates generally to a method and device for transferring a file. In accordance with one embodiment, the method may include, receiving a file transfer request including information of a file and the file receiver; separating the file into multiple file segments; pushing the multiple file segments to the file receiver; if receiving a retransfer request sent by the file receiver, pushing the file segment assigned by the retransfer request to the file receiver; if receiving an acknowledgement sent by the file receiver, ending the file transferring, the acknowledgement indicating all of the multiple file segments being received by the file receiver. The method and device provided in the disclosed embodiments can transfer file more reliable.

20 Claims, 5 Drawing Sheets

(56) References Cited

U.S. PATENT DOCUMENTS

| | | | | |
|---|---|---|---|---|
| 2001/0015823 | A1* | 8/2001 | Sato | H04N 1/00917 358/1.15 |
| 2005/0149923 | A1* | 7/2005 | Lee | G06F 8/65 717/172 |
| 2007/0043874 | A1* | 2/2007 | Nath | H04L 69/14 709/230 |
| 2010/0094923 | A1* | 4/2010 | Martinez | H04W 4/003 709/201 |
| 2011/0033169 | A1* | 2/2011 | Ando | G11B 27/105 386/241 |
| 2011/0208933 | A1* | 8/2011 | Selfin | G06F 11/108 711/162 |
| 2011/0246734 | A1* | 10/2011 | Umbehocker | G06F 3/0608 711/162 |
| 2012/0079323 | A1* | 3/2012 | Chincisan | H04L 1/1642 714/18 |

FOREIGN PATENT DOCUMENTS

| | | |
|---|---|---|
| CN | 102325167 A | 1/2012 |
| WO | PCT/CN2013/088322 | 12/2013 |

* cited by examiner

METHOD AND DEVICE FOR TRANSFERRING FILE

CROSS-REFERENCE

This application is a U.S. continuation application under 35 U.S.C. § 111(a) claiming priority under 35 U.S.C. § 120 and 365(c) to International Application No. PCT/CN2013/088322 filed Dec. 2, 2013, which claims the priority benefit of Chinese Patent Application No. 201310047083.5, filed on Feb. 6, 2013, the contents of which are incorporated by reference herein in their entirety for all intended purposes.

FIELD OF THE INVENTION

The present disclosure relates to computer field, and more particularly to a method and a device for transferring a file.

BACKGROUND OF THE INVENTION

Internet Data Center (IDC) is a facility based on internet and used to house devices, which collect, store, process, and transfer data. It also provides internet related services. In general, a large internet service relies on single or multiple IDCs. For a fast internet access speed, a same internet related service is deployed in different IDC, especially in an area having a complex network environment. Even if in one single IDC, a same internet service is usually deployed on multiple devices for a high load capability.

Therefore, data interactions exist between IDCs and devices in the IDC. For example, when a device A in an IDC A in Shenzhen transfers files to a device B in an IDC B in Shanghai, data interact between IDC A and IDC B. In conventional methods and devices for transferring files, Transmission Control Protocol (TCP) and User Datagram Protocol (UDP) are usually used. However, the TCP is reliable but inefficient due to long connection, and the UDP is efficient but unreliable.

SUMMARY OF THE INVENTION

Therefore, it is necessary to provide an efficient and reliable method and device for transferring a file.

In accordance with one embodiment, a method for transferring a file from a file source to a file receiver, at the file source, may includes: receiving a file transfer request including information of a file and the file receiver; separating the file into multiple file segments; pushing the multiple file segments to the file receiver; if receiving a retransfer request sent by the file receiver, pushing the file segment assigned by the retransfer request to the file receiver; if receiving an acknowledgement sent by the file receiver, ending the file transferring, the acknowledgement indicating all of the multiple file segments being received by the file receiver.

In accordance with another embodiment, a method for transferring a file from a file source to a file receiver, at the file receiver, may include: receiving the multiple file segments sent by the file source; rebuilding the file according to each file segment's identity, and marking a status of the received file segments as being transferred; obtaining information of un-transferred file segments and sending a retransfer request to the file source, the retransfer request assigning the file segment to be retransferred; and if all file segments have been transferred, sending an acknowledgement to the file source, the acknowledgement indicating all of the multiple file segments being received by the file receiver.

In accordance with yet another embodiment, a device for transferring a file from a file source to a file receiver, the device at the file source may includes a request receiving module, a file separating module, a transferring module, and an ending module. The request receiving module is configured to receive a file transfer request including information of a file and the file receiver. The file separating module is configured to separate the file into multiple file segments. The transferring module is configured to push the multiple file segments to the file receiver, and send the file segment assigned by a retransfer request to the file receiver after receiving the retransfer request sent by the file receiver. The ending module is configured to end the file transferring after receiving an acknowledgement sent by the file receiver, the acknowledgement indicating all of the multiple file segments being received by the file receiver.

In accordance with yet another embodiment, a device at a file receiver for transferring a file from a file source to the file receiver may include a file segment receiving module, a file rebuilding module, a retransfer request module and a confirming module. The file segment receiving module is configured to the multiple file segments sent by the file source. The file rebuilding module is configured to rebuild the file according to each file segment's identity, and mark a status of the received file segments as being transferred. The retransfer request module is configured to obtain information of un-transferred file segments and send a retransfer request to the file source, the retransfer request assigning the file segment to be retransferred. The confirming module is configured to send an acknowledgement to the file source if all file segments have been transferred, the acknowledgement indicating all of the multiple file segments being received by the file receiver.

In the embodiments of the present disclosure, the retransfer requests for resending the assigned file segment guarantee the reliability of the transferring.

Figure 1:
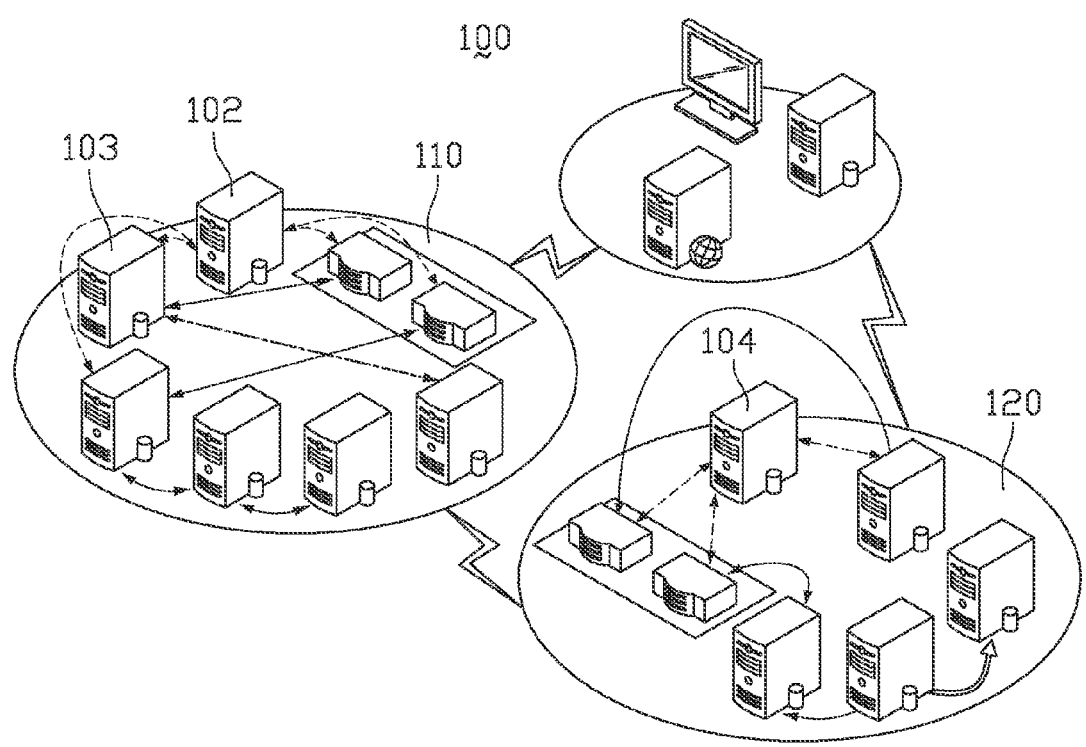
FIG. 1 illustrates a structure of an Internet Data Center.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF PREFERRED EMBODIMENTS

Various embodiments of the disclosure are discussed in detail below. While specific implementations are discussed, it should be understood that this is done for illustration purposes only.

The embodiments discussed below relate generally to transfer a file from a file source to a file receiver. The file source and file receiver, as an example, may be different terminals or servers in different data centers. An exemplary computing system for the file source and the file receiver may include a processor, a storage medium, a monitor, a communication module, a database, peripherals, and one or more bus to couple the devices together. Certain devices may be omitted and other devices may be included.

The processor may include any appropriate processor or processors. Further, processor can include multiple cores for multi-thread or parallel processing. Storage medium may include memory modules, such as ROM, RAM, and flash memory modules, and mass storages, such as CD-ROM, U-disk, removable hard disk, etc. Storage medium may store computer programs for implementing various processes, when executed by processor.

Further, the monitor may include display devices for displaying certain user interface contents such as splash screens. Peripherals may include I/O devices such as keyboard and mouse, and communication module may include network devices for establishing connections through the communication network. Database may include one or more databases for storing certain data and for performing certain operations on the stored data, such as database management, data extraction/analysis.

The exemplary environment may include at least two data centers. The data centers may be coupled through a communication network for information exchange, such as sending/receiving verify information, sending/receiving files. Any number of terminals or servers may be included in the data center, and other devices may also be included. The file source may be a terminal or a server in one data center, and the file receiver may be a terminal or a server in another data center.

The communication network may include any appropriate type of communication network for providing network connections to the server and client or among multiple servers or terminals. For example, communication network may include the Internet or other types of computer networks or telecommunication networks, either wired or wireless.

In some cases, the terminal may refer to any appropriate user terminal with certain computing capabilities, such as a personal computer (PC), a work station computer, a server computer, a hand-held computing device (tablet), a smart phone or mobile phone, or any other user-side computing device. The server, as used herein, may refer to one or more server computers configured to provide certain server functionalities, such as file management.

FIG. 1 illustrates the structure of an exemplary Internet Data Center (IDC). As FIG. 1 shows, IDC 100 may include a first data center 110 and a second data center 120. The first data center 110 and the second data center 120 may respectively include a control module 102. The first data center 110 includes a file source 103 for example. The second data center 120 includes a file receiver 104 for example.

Figure 2:
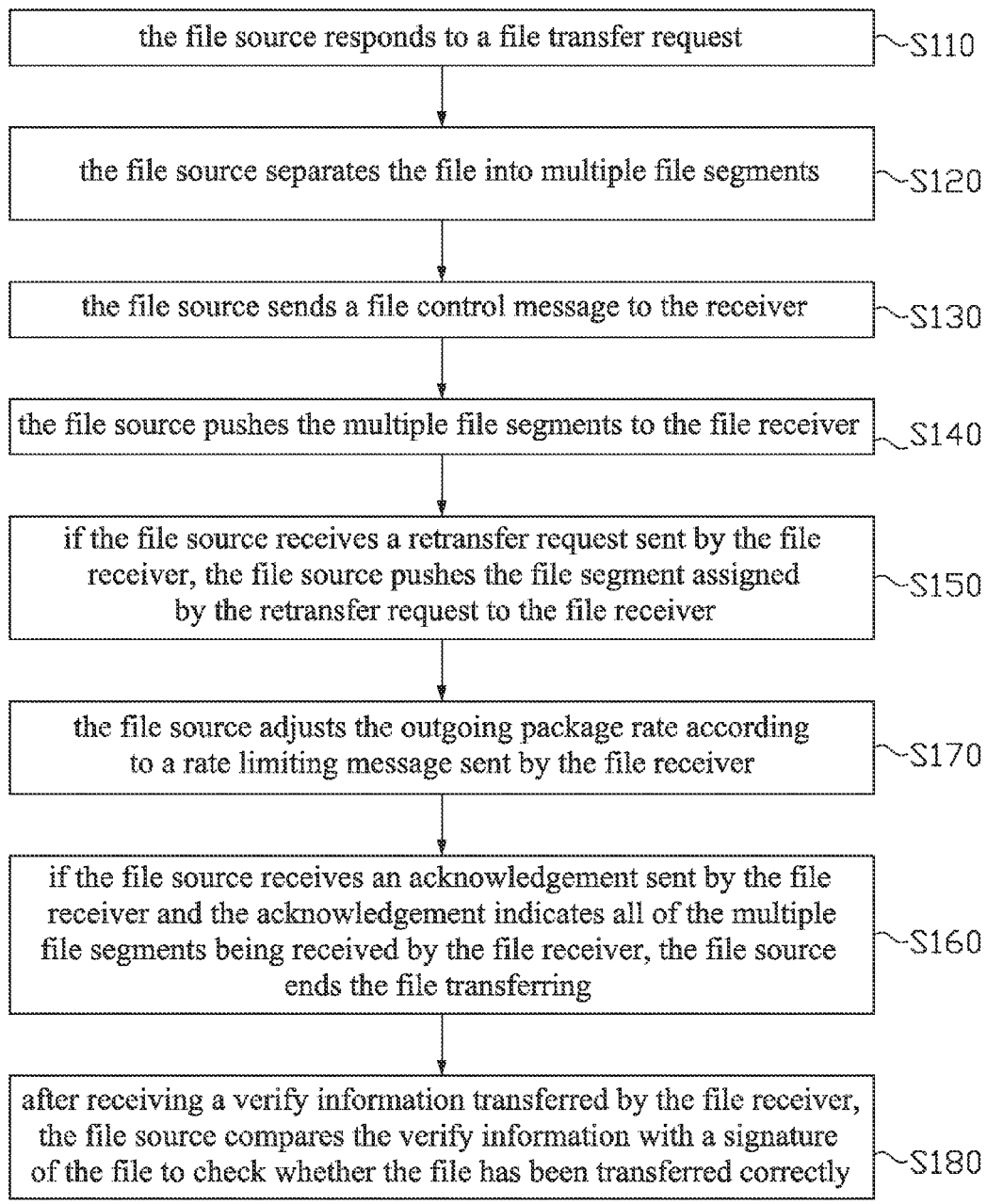
FIG. 2 is a flow chart of a method for transferring a file provided by one embodiment of the present disclosure.

FIG. 2 is a flowchart illustrating one example of a method for transferring a file from a file source to a file receiver. In the example, the file source may be the file source 103 including one or more processors operation with a memory and a plurality of modules. In some implementations, the memory or the non-transitory computer readable storage medium of the memory stores the following programs executed by the one or more processors.

Referring to FIGS. 1 and 2, in Step 110, the file source may respond to a file transfer request.

The file transfer request, for example, may be sent by the control module 102 in the first data center 110 to the file source 103. Then the file source 103 receives the file transfer request. The file transfer request may include information of the file and information of the file receiver. The information of the file may include the file's name, size and identity (ID), etc. The information of the file receiver may include ID or address of the file receiver. The file receiver may be assigned by the control module 102. The number of file receiver may include one or multiple terminals or servers.

In Step 120, the file source may separate the file into multiple file segments.

After receiving the file transfer request, the file source 103 may separate the file into multiple file segments. Each file segment may have a corresponding identity. The Step 120 may facilitate internet transferring. In other words, each file segment may have a size suitable for the internet transferring. In some embodiments, all of the multiple file segments may have a same size.

In Step 130, the file source may send a file control message to the receiver.

After separating the file, the file source 103 may send a file control message to the file receiver 104. The file control message may include the number of the file segments, the storage path of the file, etc. The number of the file segments represents how many segments the file is separated into.

In Step 140, the file source pushes the multiple file segments to the file receiver.

In the exemplary embodiment, all of the file segments may be sent to the file receiver 104 via connectionless internet protocol, for example, User Datagram Protocol (UDP). Using the connectionless internet protocol, the file can be transferred more efficiently.

After pushing the multiple file segments to the file receiver, the file source may monitor the feedback information sent by the file receiver.

If the file source receives a retransfer request sent by the file receiver, Step 150 is executed. In Step 150, the file source pushes the file segment assigned by the retransfer request to the file receiver.

The file source may monitor the retransfer request sent from the file receiver, while transferring the file segments to the file receiver or after all file segments being transferred to the file receiver. The retransfer request is configured to ask the file source to resend the assigned file segment. When the file source receives the retransfer request, the assigned file segment needs to be sent again. The retransfer request may include the identity or storage path of the assigned file segment.

If the file source receives an acknowledgement sent by the file receiver and the acknowledgement indicates all of the multiple file segments being received by the file receiver, Step 160 is executed. In Step 160, the file source ends the file transferring.

At the file source 103, the acknowledgment sent by the file receiver 104 is monitored. The acknowledgement is configured to notify the file source 103 that all of the file segments have been transferred successfully and the transferring may stop. When the file source 103 gets the acknowledgement, the file transferring is finished.

After the above steps, the file is transferred from the file source 103 to the file receiver 104.

In the exemplary embodiment, the retransfer requests for resending the assigned file segment guarantee the reliability of the transferring.

Furthermore, during the file transferring process, the method may further include following step:

In Step 170, the file source may adjust the outgoing package rate according to a rate limiting message sent by the file receiver.

The file receiver 104 may send the rate limiting message according to transfer parameters of the file receiver, such as a package rate of corruption data, a package loss rate, and a disk usage rate, etc.

For example, the file receiver 104 may count the number of wrong packages of the Ethernet card in a statistical cycle, and then calculates the corruption data package rate (MB/s) in the statistical cycle, wherein the package size is 1024 bytes. If the corruption data package rate is larger than 0.5 MB/s, the file receiver may send the rate limiting message for asking the file source 103 to decrease 1 Mb/s in the outgoing package rate, until the corruption data package rate is under 0.5 Mb/s, otherwise asking the file source 103 to increase 1 Mb/s in the outgoing package rate.

For another example, the file receiver 104 may calculate the package loss rate since the beginning of the file transferring. If the package loss rate is above 3%, the file receiver 104 may send the rate limiting message for asking the file source 103 to decrease 2 Mb/s in the outgoing package rate, otherwise asking the file source 103 to increase 2 Mb/s in the outgoing package rate.

For one more example, if the disk usage rate is above 99%, the file receiver 104 may send the rate limiting message for asking the file source 103 to decrease 2 Mb/s in the outgoing package rate, otherwise asking the file source 103 to increase 2 Mb/s in the outgoing package rate.

The file source 103 may adjust the outgoing package rate according to the rate limiting message sent by the file receiver.

Furthermore, the method may further include following step:

In Step 180, after receiving a verify information transferred by the file receiver, the file source compares the verify information with a signature of the file to check whether the file has been transferred correctly.

After receiving all the file segments pushed by the file source 103, the file receiver 104 rebuilds the file according to each file segment's identity. The file receiver 104 may calculate a signature, for example, MD5 code, of the rebuilt file and sent the signature to the file source 103 to ensure the integrity of the file. The file source 103 may compare the signature of the rebuilt file with the signature of the file. If they have a same value, the file is transferred correctly; otherwise, the file has to be retransferred. Thus, the reliability of the file transferring is further guaranteed.

Figure 3:
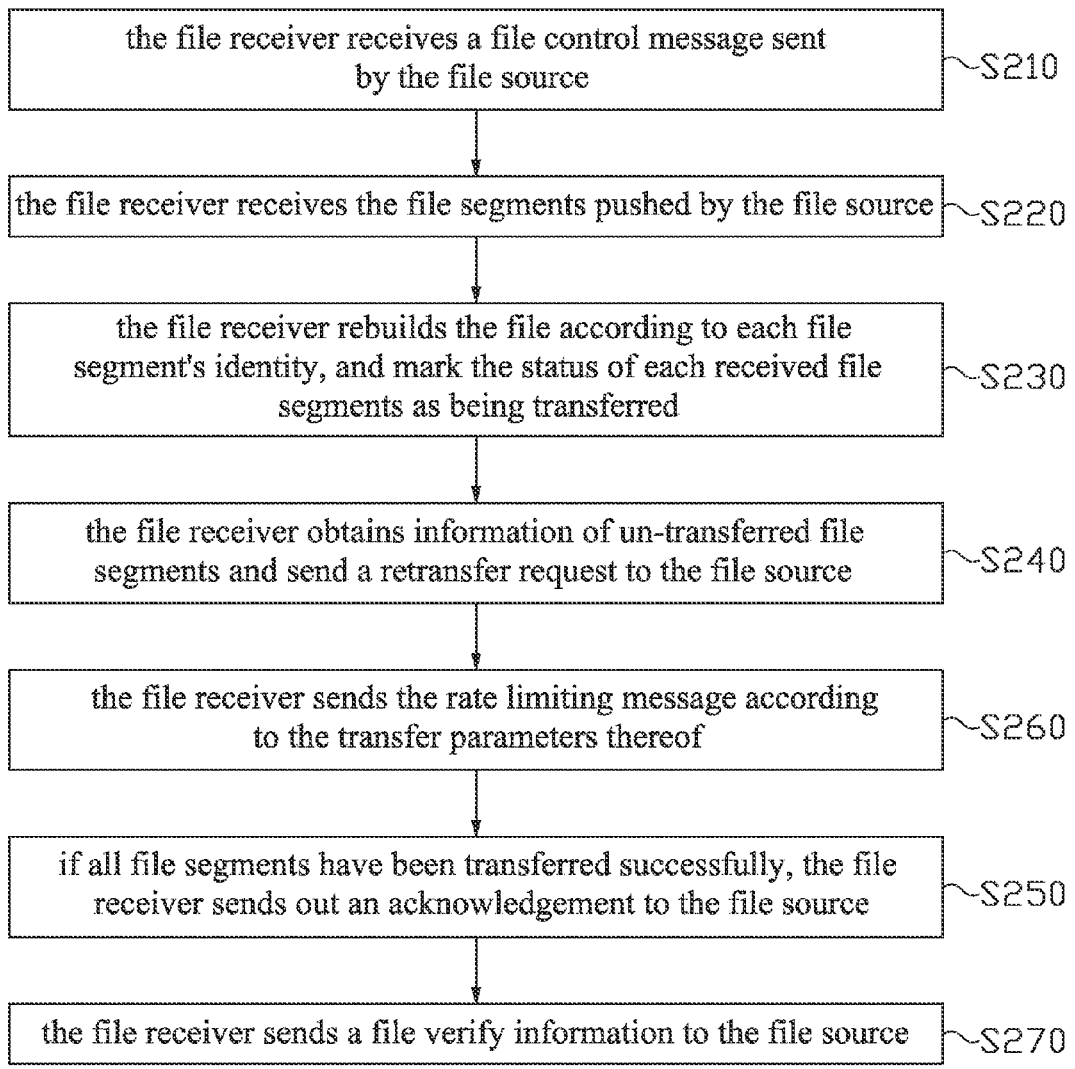
FIG. 3 is a flow chart of a method for transferring a file provided by another embodiment of the present disclosure.

FIG. 3 is a flowchart illustrating another example of a method for transferring a file from a file source to a file receiver. In the example, the file receiver may be the file receiver 104 including one or more processors operation with a memory and a plurality of modules. In some implementations, the memory or the non-transitory computer readable storage medium of the memory stores the following programs executed by the one or more processors.

Referring to FIGS. 1 and 3, in Step 210, the file receiver receives a file control message sent by the file source. The file control message includes the specific number of the multiple file segments of a file.

After receiving the file transfer request, the file source 103 may separate the file into multiple file segments, and sent the file control message, which for example may include the storage path of the file or the number of the file segments, to the file receiver 104. The file receiver 104 receives the file control message sent by the file source 103.

In Step 220, the file receiver receives the file segments pushed by the file source.

After receiving the file control message of the file source 103, the file receiver 104 may detect the data of a predefined network port. The file source 103 may push a network package including the file segments to the predefined network port, and the file receiver 104 receives the file segments pushed by the file source 103. In the exemplary embodiment, all of the file segments may be sent to the file receiver 104 via connectionless internet protocol, for example, User Datagram Protocol (UDP). Using the connectionless internet protocol, the file can be transferred more efficiently.

In Step 230, the file receiver may rebuild the file according to each file segment's identity, and mark the status of each received file segments as being transferred.

After receiving a network package including the file segments, the file receiver 104 may analyze the ID of the file segments, and rebuilds the file according to the ID of the file segments. The status of the received file segments are then be marked as transferred.

The marking process may be processed in a bitmap storage space in the memory. After receiving the file control message sent by the file source 103, the file receiver 104 may allocate the bitmap storage space according to the specific number of the file segments. The bitmap storage space includes multiple storage units respectively corresponding to the multiple file segments. Each storage unit may occupy, for example, 1 bit storage space. The bitmap storage space is initialized to set all the storage units with a value means un-transferred. In the exemplary embodiment, 0 means un-transferred, and 1 means transferred, therefore, 0 is set to the storage unit corresponding to the received file segments' identity in the exemplary embodiment when the bitmap storage space is initialized. When a file segment is received at the file receiver 104, the value of storage unit corresponding to the file segment is set as transferred, for example, set to 1.

In Step 240, the file receiver may obtain information of un-transferred file segments and send a retransfer request to the file source. The retransfer request may assign the file segment to be retransferred.

In Step 230, all the file segments' status are marked as transferred or un-transferred, so the un-transferred file segments may be obtained according to the status thereof.

Figure 4:
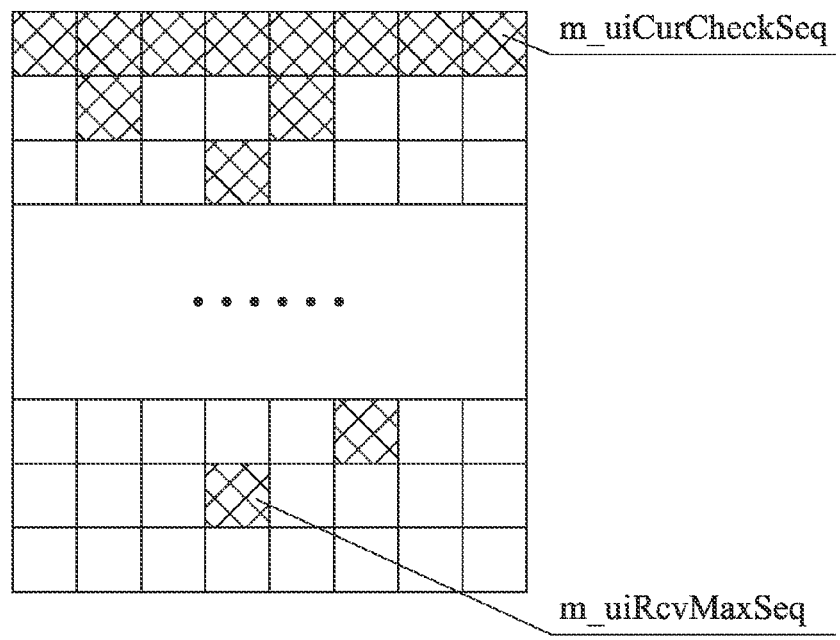
FIG. 4 shows a bitmap storage space during the transferring.

For example, FIG. 4 shows the bitmap storage space during the transferring. The deep color represents 1 and means being transferred. The light color represents 0 and means being un-transferred. The step of obtaining un-transferred file segment includes the following steps:

First, a maximum identity (m_uiRcvMaxSeq) of the received file segments' ID is obtained. Second, the un-transferred file segments whose identity is less than the maximum identity is obtained. The un-transferred file segments' ID is corresponding to the storage units whose values are 0.

While obtaining the un-transferred file segments whose identity is less than the maximum identity, the file receiver may iterate the list from 0 to m_uiRcvMaxSeq. To improve the efficiency, the max ID location (m_uiCurCheckSeq) of continuous file segments may record during the progress. Therefore, the iteration may start up from m_uiCurCheckSeq.

The Step 240 may be operated by independent thread every predefined interval periodically.

In Step 250, if all file segments have been transferred successfully, the file receiver may send out an acknowledgement to the file source. The acknowledgement indicates all of the multiple file segments being received by the file receiver.

When the values of all storage units are set to 1, it means the file segments are transferred by the file source. Then the file receiver 104 sent the acknowledgement to the file source 103.

Furthermore, during the file transferring process, the file transferring method may further include following steps:

In Step 260, the file receiver may send the rate limiting message according to the transfer parameters thereof. The transfer parameters may include a package rate of corruption data, a package loss rate, and a disk usage rate, etc.

For example, the file receiver 104 may count the number of wrong packages of the Ethernet card in a statistical cycle, and then calculates the corruption data package rate (MB/s) in the statistical cycle, wherein the package size is 1024 bytes. If the corruption data package rate is larger than 0.5 MB/s, the file receiver may send the rate limiting message for asking the file source 103 to decrease 1 Mb/s in the outgoing package rate, until the corruption data package rate is under 0.5 Mb/s, otherwise asking the file source 103 to increase 1 Mb/s in the outgoing package rate.

For another example, the file receiver 104 may calculate the package loss rate since the beginning of the file transferring. If the package loss rate is above 3%, the file receiver 104 may send the rate limiting message for asking the file source 103 to decrease 2 Mb/s in the outgoing package rate, otherwise asking the file source 103 to increase 2 Mb/s in the outgoing package rate. For one more example, if the disk usage rate is above 99%, the file receiver 104 may send the rate limiting message for asking the file source 103 to decrease 2 Mb/s in the outgoing package rate, otherwise asking the file source 103 to increase 2 Mb/s in the outgoing package rate. Furthermore, the file transferring method may include following step:

In Step 270, the file receiver sends a file verify information to the file source.

After receiving all the file segments pushed by the file source 103, the file receiver 104 rebuilds the file according to each file segment's identity. The file receiver 104 may calculate a signature, for example, MD5 code, of the rebuilt file and sent the signature to the file source 103 to ensure the integrity of the file. The file source 103 may compare the signature of the rebuilt file with the signature of the file. If they have a same value, the file is transferred correctly; otherwise, the file has to be retransferred. Thus, the reliability of the file transferring is further guaranteed.

In the exemplary embodiment, the retransfer requests for resending the assigned file segment guarantee the reliability of the transferring.

Figure 5:
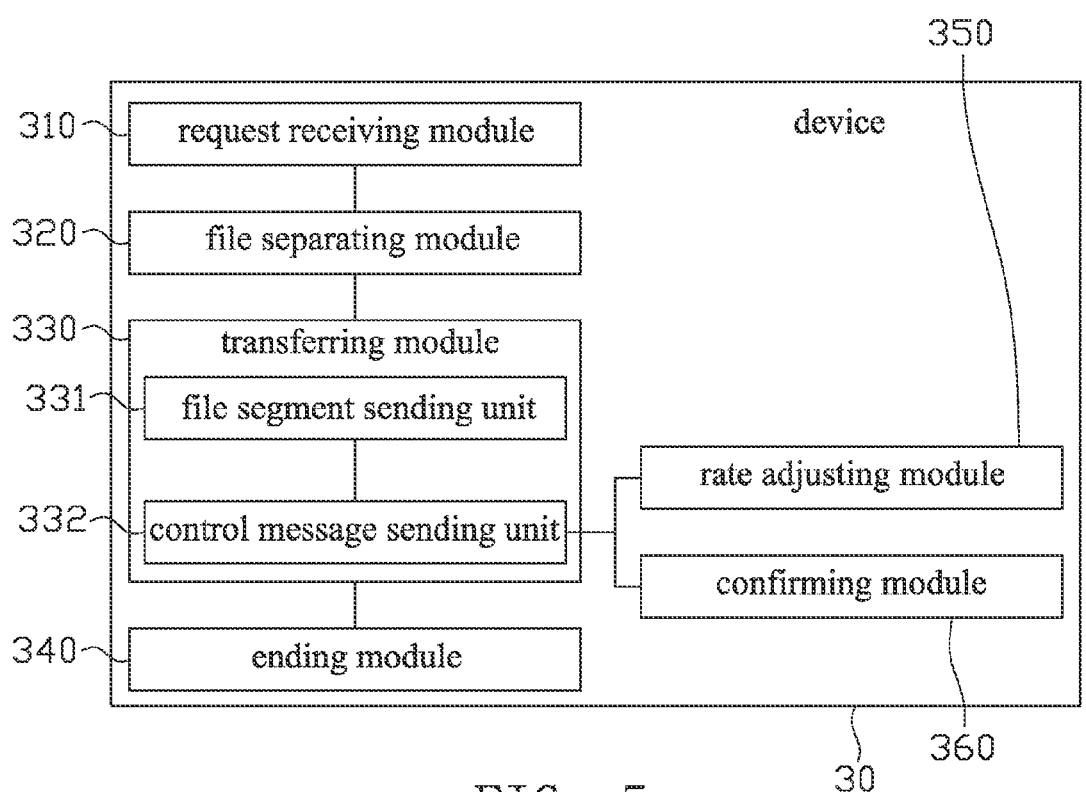
FIG. 5 is a block diagram of a device for transferring a file provided by yet another of the present disclosure.

FIG. 5 is a block diagram of a device for transferring a file from a file source to a file receiver. The device 30 at the file source may include at least a processor operating in conjunction with a memory and a plurality of modules. In the exemplary embodiment, the plurality of modules may include a request receiving module 310, a file separating module 320, a transferring module 330 and an ending module 340.

Specifically, the request receiving module 310 is configured to receive a file transfer request including information of a file and the file receiver.

The file separating module 320 is configured to separate the file into multiple file segments.

The transferring module 330 may includes a file segment sending unit 331 configured to push the multiple file segments to the file receiver, and send the file segment assigned by a retransfer request to the file receiver after receiving the retransfer request sent by the file receiver. The multiple file segments may be respectively pushed to the file receiver via connectionless internet protocol, for example User Datagram Protocol. In some embodiments, all of the multiple file segments have a same size.

The ending module 340 is configured to end the file transferring after receiving an acknowledgement sent by the file receiver, the acknowledgement indicating all of the multiple file segments being received by the file receiver.

The transferring module 330 may further include a control message sending unit 332, configured to send a file control message including the number of multiple file segments of the file.

The device 30 may further include a rate adjusting module 350 configured to adjust the outgoing package rate according to a rate limiting message sent by the file receiver.

The device 30 may further include a confirming module 360 configured to compare a verify information transferred by the file receiver with a signature of the file to check whether the file has been transmitted correctly.

Other details of the device for transferring a file may refer to example of FIGS. 1 and 2, and corresponding description.

In the exemplary embodiment, the retransfer requests for resending the assigned file segment guarantee the reliability of the transferring.

Figure 6:
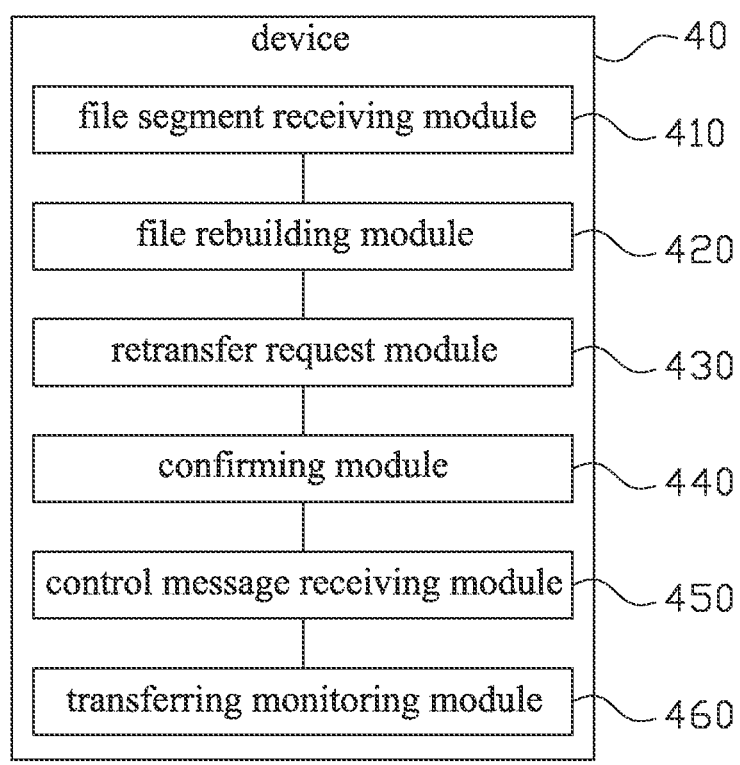
FIG. 6 is a block diagram of a device for transferring a file provided by yet another embodiment of the present disclosure.

FIG. 6 is a block diagram of a device for transferring a file from a file source to a file receiver. The device 40 at the file receiver may include at least a processor operating in conjunction with a memory and a plurality of modules. In the exemplary embodiment, the plurality of modules may include a file segment receiving module 410, a file rebuilding module 420, a retransfer request module 430 and a confirming module 440.

Specifically, the file segment receiving module 410 is configured to the multiple file segments pushed by the file source.

The file rebuilding module 420 is configured to rebuild the file according to each file segment's identity, and mark a status of the received file segments as being transferred;

The retransfer request module 430 is configured to obtain information of un-transferred file segments and send a retransfer request to the file source, the retransfer request assigning the file segment to be retransferred.

The confirming module 440 is configured to send an acknowledgement to the file source if all file segments have been transferred, the acknowledgement indicating all of the multiple file segments being received by the file receiver.

The device 40 may further include a control message receiving module 450, configured to receive a file control message sent by the file source, wherein the file control message including the number of multiple file segments of the file.

The device 40 may further include a transferring monitoring module 460, configured to allocate bitmap storage space according to the specific number of multiple file segments, wherein the bitmap storage space comprises multiple storage units respectively corresponding to the multiple file segments and initialize the bitmap storage space. The file rebuilding module is also configured to set a predetermined value to the storage unit corresponding to the received file segments' identity.

In some embodiments, the retransfer request module 430 is also configured to obtain a maximum identity of the received file segments' identity and obtain the un-transferred file segments whose identity are less than the maximum identity.

The device 40 may further include a rate limiting module 470, configured to send a rate limiting message to the file source according to transfer parameters, wherein the transfer parameters may include package rate of corruption data, package loss rate, and disk usage rate.

Other details of the device for transferring a file may refer to FIGS. 1, 3 and 4, and corresponding description.

In the exemplary embodiment, the retransfer requests for resending the assigned file segment guarantee the reliability of the transferring.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

It should be noted that when the device for transferring message file in the above-mentioned embodiments, processes a message, illustration is made according to the division of the above-mentioned functional modules, and in practical application, the above-mentioned functions can be assigned to be performed by different functional modules as required, i.e., dividing the internal structure of the device into different functional modules to perform all or some of the above-described functions. In addition, the device for transferring a file and the method for transferring a file provided by the above-mentioned embodiments belong to the same concept, and its specific implementation process is seen in the method embodiment, which will not be repeated here.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing Steps of the methods disclosed herein. The particular sequence of such executable instructions or associated data structures represents examples of corresponding acts for implementing the functions described in such Steps. Program modules may also comprise any tangible computer-readable medium in connection with the various hardware computer components disclosed herein, when operating to perform a particular function based on the instructions of the program contained in the medium.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The order by which the foregoing embodiments of the present disclosure are presented merely reflects the convenience of description. It does not imply the preference among the embodiments.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for transferring a file from a file source to a file receiver, wherein the file source is in a first data center and the file receiver in a second data center, the method performed at the file receiver having one or more processors and memory storing one or more programs to be executed by the one or more processors, the method comprising:
   receiving, at the file receiver assigned by a control module in the first data center, multiple file segments pushed by the file source and a file control message sent by the file source, wherein the file control message includes a total number of file segments of the file and a storage path of the file, and wherein each file segment has an ID related to a relative position of the file segment within the file;
   in response to receiving the file control message:
      allocating a bitmap storage space according to the total number of file segments, wherein the bitmap storage space comprises multiple storage units respectively corresponding to the received multiple file segments, and wherein each storage unit is marked with a state value corresponding to a transferred state or an un-transferred state of the corresponding file segment; and
      initializing the bitmap storage space, comprising marking the multiple storage units with the state value corresponding to the un-transferred state;
   in response to receiving the multiple file segments pushed by the file source:
      rebuilding the file according to the IDs of the received multiple file segments; and
      marking one or more storage units corresponding to the received multiple file segments with the state value corresponding to the transferred state;
   periodically obtaining information of un-transferred file segments by identifying a largest set of storage units having the state values corresponding to the un-transferred state;
   sending a retransfer request to the file source, the retransfer request identifying the un-transferred file segments to be retransferred based on the obtained information of the un-transferred file segments; and
   after all file segments of the file have been transferred, sending an acknowledgement to the file source, the acknowledgement indicating all of the file segments being received by the file receiver.

2. The method as claimed in claim 1, wherein the largest set of storage units having the state values corresponding to the un-transferred state are located between a first storage unit corresponding to a received file segment having a maximum ID among the received multiple file segments and a second storage unit corresponding to a received file segment having a maximum ID within a group of received file segments consecutively allocated in the bitmap storage space.

3. The method as claimed in claim 1, further comprising:
   sending a rate limiting message to the file source according to one or more transfer parameters of the file receiver, wherein the transfer parameters comprise package rate of a corruption data, a package loss rate, and a disk usage rate.

4. The method as claimed in claim 1, further comprising:
   generating a first signature based on the file rebuilt at the file receiver; and
   sending the first signature to the file source for comparison with a second signature of the file to verify integrity of the file rebuilt at the file receiver.

5. The method as claimed in claim 1, wherein the multiple file segments are transferred from the file source to the file receiver via connectionless internet protocol.

6. The method as claimed in claim 5, wherein the connectionless internet protocol is User Datagram Protocol.

7. The method as claimed in claim 1, wherein the multiple file segments have the same size.

8. A file receiver for receiving a file from a file source, wherein the file source is in a first data center and the file receiver in a second data center, the file receiver comprising:
   one or more processors; and
   memory storing one or more programs, wherein the one or more programs, when executed by the one or more processors, cause the file receiver to perform a plurality of operations including:
      receiving, at the file receiver assigned by a control module in the first data center, multiple file segments pushed by the file source and a file control message sent by the file source, wherein the file control message includes a total number of file segments of the file and a storage path of the file, and wherein each file segment has an ID related to a relative position of the file segment within the file;
      in response to receiving the file control message:
         allocating a bitmap storage space according to the total number of file segments, wherein the bitmap storage space comprises multiple storage units respectively corresponding to the received multiple file segments, and wherein each storage unit is marked with a state value corresponding to a transferred state or an un-transferred state of the corresponding file segment; and
         initializing the bitmap storage space, comprising marking the multiple storage units with the state value corresponding to the un-transferred state;
      in response to receiving the multiple file segments pushed by the file source:
         rebuilding the file according to the IDs of the received multiple file segments; and
         marking one or more storage units corresponding to the received multiple file segments with the state value corresponding to the transferred state;
      periodically obtaining information of un-transferred file segments by identifying a largest set of storage units having the state values corresponding to the un-transferred state;
      sending a retransfer request to the file source, the retransfer request identifying the un-transferred file segments to be retransferred based on the obtained information of the un-transferred file segments; and
      after all file segments of the file have been transferred, sending an acknowledgement to the file source, the acknowledgement indicating all of the file segments being received by the file receiver.

9. The file receiver as claimed in claim 8, wherein the largest set of storage units having the state values corresponding to the un-transferred state are located between a first storage unit corresponding to a received file segment having a maximum ID among the received multiple file segments and a second storage unit corresponding to a received file segment having a maximum ID within a group of received file segments consecutively allocated in the bitmap storage space.

10. The file receiver as claimed in claim 8, wherein the one or more programs further cause the file receiver to:
send a rate limiting message to the file source according to one or more transfer parameters of the file receiver, wherein the transfer parameters comprise package rate of a corruption data, a package loss rate, and a disk usage rate.

11. The file receiver as claimed in claim 8, wherein the one or more programs further cause the file receiver to:
generate a first signature based on the file rebuilt at the file receiver; and
send the first signature to the file source for comparison with a second signature of the file to verify integrity of the file rebuilt at the file receiver.

12. The file receiver as claimed in claim 8, wherein the multiple file segments are transferred from the file source to the file receiver via connectionless internet protocol.

13. The file receiver as claimed in claim 12, wherein the connectionless internet protocol is User Datagram Protocol.

14. The file receiver as claimed in claim 8, wherein the multiple file segments have the same size.

15. A non-transitory computer readable storage medium storing one or more programs, the one or more programs comprising instructions, which when executed by a file receiver, cause the file receiver to perform a plurality of operations including:
receiving, at the file receiver assigned by a control module in the first data center, multiple file segments pushed by the file source and a file control message sent by the file source, wherein the file control message includes a total number of file segments of the file and a storage path of the file, and wherein each file segment has an ID related to a relative position of the file segment within the file;
in response to receiving the file control message:
allocating a bitmap storage space according to the total number of file segments, wherein the bitmap storage space comprises multiple storage units respectively corresponding to the received multiple file segments, and wherein each storage unit is marked with a state value corresponding to a transferred state or an un-transferred state of the corresponding file segment; and
initializing the bitmap storage space, comprising marking the multiple storage units with the state value corresponding to the un-transferred state;
in response to receiving the multiple file segments pushed by the file source:
rebuilding the file according to the IDs of the received multiple file segments; and
marking one or more storage units corresponding to the received multiple file segments with the state value corresponding to the transferred state;
periodically obtaining information of un-transferred file segments by identifying a largest set of storage units having the state values corresponding to the un-transferred state;
sending a retransfer request to the file source, the retransfer request identifying the un-transferred file segments to be retransferred based on the obtained information of the un-transferred file segments; and
after all file segments of the file have been transferred, sending an acknowledgement to the file source, the acknowledgement indicating all of the file segments being received by the file receiver.

16. The non-transitory computer readable storage medium as claimed in claim 15, wherein the largest set of storage units having the state values corresponding to the un-transferred state are located between a first storage unit corresponding to a received file segment having a maximum ID among the received multiple file segments and a second storage unit corresponding to a received file segment having a maximum ID within a group of received file segments consecutively allocated in the bitmap storage space.

17. The non-transitory computer readable storage medium as claimed in claim 15, wherein the one or more programs further cause the file receiver to:
send a rate limiting message to the file source according to one or more transfer parameters of the file receiver, wherein the transfer parameters comprise package rate of a corruption data, a package loss rate, and a disk usage rate.

18. The non-transitory computer readable storage medium as claimed in claim 15, wherein the one or more programs further cause the file receiver to:
generate a first signature based on the file rebuilt at the file receiver; and
send the first signature to the file source for comparison with a second signature of the file to verify integrity of the file rebuilt at the file receiver.

19. The non-transitory computer readable storage medium as claimed in claim 15, wherein the multiple file segments are transferred from the file source to the file receiver via connectionless internet protocol, and wherein the connectionless internet protocol is User Datagram Protocol.

20. The non-transitory computer readable storage medium as claimed in claim 15, wherein the multiple file segments have the same size.

* * * * *